United States Patent
Conrad

(10) Patent No.: US 6,684,480 B2
(45) Date of Patent: Feb. 3, 2004

(54) METHOD FOR MAKING A THROUGH OPENING IN A HIGH-PRESSURE FUEL RESERVOIR, AND APPARATUS FOR PERFORMING THE METHOD

(75) Inventor: Wolf-Ruediger Conrad, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 1 day.

(21) Appl. No.: 09/936,617
(22) PCT Filed: Nov. 29, 2000
(86) PCT No.: PCT/DE00/04246
§ 371 (c)(1), (2), (4) Date: Jan. 4, 2002
(87) PCT Pub. No.: WO01/53694
PCT Pub. Date: Jul. 26, 2001

(65) Prior Publication Data
US 2002/0157231 A1 Oct. 31, 2002

(30) Foreign Application Priority Data
Jan. 15, 2000 (DE) .......................................... 100 01 507

(51) Int. Cl.⁷ ................................................. B23P 13/04
(52) U.S. Cl. .............................. 29/558; 408/87; 408/79; 408/1 R; 29/888.01; 29/890.12
(58) Field of Search ..................... 29/558, 557, 888.01, 29/888.011, 888.4, 888.43, 890.12, 890.122, 890.132; 409/143; 408/1 R, 87, 79; 279/241 R, 87

(56) References Cited

U.S. PATENT DOCUMENTS

| | | | | |
|---|---|---|---|---|
| 315,074 A | * | 4/1885 | Root ..................... 285/133.21 |
| 1,264,854 A | * | 4/1918 | Possons ................... 29/890.15 |
| 4,399,829 A | * | 8/1983 | Schuler ................... 137/15.14 |
| 4,978,255 A | * | 12/1990 | Gale et al. ................. 408/1 R |
| 5,172,939 A | * | 12/1992 | Hashimoto ................... 285/24 |
| 5,775,302 A | * | 7/1998 | Guido et al. ................. 123/468 |
| 6,126,208 A | * | 10/2000 | Asada et al. ............. 285/133.4 |
| 6,213,095 B1 | * | 4/2001 | Asada et al. ................ 123/456 |
| 6,317,975 B1 | * | 11/2001 | Asada et al. ............. 29/888.01 |
| 6,340,275 B1 | * | 1/2002 | Amaike et al. ............. 408/1 R |
| 6,470,856 B1 | * | 10/2002 | Boecking ................... 123/456 |

FOREIGN PATENT DOCUMENTS

| JP | 10318085 | 12/1998 |
|---|---|---|
| JP | 11182381 | 7/1999 |

* cited by examiner

Primary Examiner—Gregory Vidovich
Assistant Examiner—Stephen Kenny
(74) Attorney, Agent, or Firm—Ronald E. Greigg

(57) ABSTRACT

A method for making a through opening in a high-pressure fuel reservoir that has an elongated, tubular jacket body, which body is provided in the longitudinal direction with a continuous recess, open on at least one end, that forms the interior of the high-pressure fuel reservoir, and the through opening is made in the jacket body in the form of a bore by a machining tool in such a way that this opening discharges into the continuous recess. In order to avoid burrs, before the through opening is made, a pressure part is pressed against the inner wall of the jacket body in the region of the expected outlet of the through opening, and with the machine an tool, drilling is done through the jacket body some distance into the pressure part.

10 Claims, 2 Drawing Sheets

METHOD FOR MAKING A THROUGH OPENING IN A HIGH-PRESSURE FUEL RESERVOIR, AND APPARATUS FOR PERFORMING THE METHOD

CROSS-REFERENCE TO RELATED APPLICATIONS

This application is a 35 USC 371 application of PCT/DE 00/04246 filed on Nov. 29, 2000.

BACKGROUND OF THE INVENTION

1. Field of the Invention

The invention relates to a method and an apparatus for making through openings in a high-pressure fuel reservoir.

2. Description of the Prior Art

From German Patent Disclosure DE 196 40 480 A1, a high-pressure fuel reservoir for a fuel injection system for internal combustion engines is known which comprises an elongated, tubular jacket body of steel into which a high-pressure fuel pump can be connected. The jacket body has a longitudinally extending continuous recess, open on at least one end, that forms the interior of the high-pressure fuel reservoir. In the fully installed state of the high-pressure fuel reservoir, the at least one open end is closed by the attachment of the high-pressure fuel pump or of a pressure limiting valve, or in some other way. By way of a plurality of connections embodied on the jacket body and high-pressure lines connected to them, the fuel subjected to high pressure that is contained in the high-pressure fuel reservoir is delivered to electrically controlled injection valves, so-called injectors, for injection into the combustion chambers of a self-igniting internal combustion engine. A high-pressure fuel reservoir of this kind is also known as a common rail. The connections of the high-pressure fuel reservoir are embodied in the form of connection stubs, which protrude from the jacket body and are each provided with a through opening embodied as a bore, which opens into the continuous recess of the jacket body. The through openings can also open eccentrically into the continuous recess.

In the conventional production of the through openings with a machining tool, a more or less markedly pronounced burr surrounding the bore is created at the outlet point of the tool in the continuous recess. Because of the high internal pressure in the high-pressure fuel reservoir, which is about 1350 bar, and because of the narrow diameters of the bores, typically 2.4 mm, abrasive particles in the fuel cause wear in the region of the encompassing edge formed by the through opening and the inner wall of the continuous recess. The occurrence of abrasive particles is disadvantageously further reinforced by the burr surrounding the bore, because relatively large particles can become detached there and damage the injection nozzles. Furthermore, the presence of a burr surrounding the bore favors the development of eddies and unfavorable flow properties, which can very adversely affect the service life of the high-pressure fuel reservoir, given the increasing pressure loads on it.

SUMMARY OF THE INVENTION

These disadvantages are reliably avoided by the method for making through openings in a high-pressure fuel reservoir according to the invention. Because before the through opening is made, a pressure part is pressed against the inner wall of the jacket body in the region of the expected outlet of the through opening, and with the machine tool, drilling is done through the jacket body some distance into the pressure part, the occurrence of a burr surrounding the bore is advantageously avoided. This method is especially advantageous at places in the high-pressure fuel reservoir where later metal-cutting deburring is not possible.

It is also especially advantageous that because of the creation of the burr-free bores, a subsequent rounding off or chamfering of the edge formed by the bore and the inner wall of the continuous recess is made possible, so that especially evenly rounded-off or chamfered edge structures can be created. In the prior art, because of the development of a burr in the drilling, these methods do not lead to the desired results.

Advantageously, to produce a through opening, a chucking device that can be introduced into the continuous recess can be used, having a first chucking jaw, an interchangeable pressure part, a second chucking jaw, and a chucking part disposed between the first chucking jaw and the second chucking jaw, by which chucking part the pressure part and the second chucking jaw can be pressed into contact with the inner wall of the continuous recess. Once the bore has been made, which ends in the pressure part in a blind bore, the chucking device is removed from the high-pressure fuel reservoir, and the pressure part is replaced. The chucking device is now ready for use again. Advantageously, the pressure part can be used as an insertion part inserted into a recess of the first chucking jaw. The pressure part comprises metal or a very hard plastic, which is approximately equivalent in its hardness to the hardness of the jacket body.

Advantageously, the radius of curvature of the face of the pressure part oriented toward the inner wall of the continuous recess is adapted precisely, at the point intended for making the through opening, to the radius of curvature of the inner wall of the continuous recess.

An apparatus for rounding off the encompassing edge formed by the through opening and the inner wall of the continuous recess, which includes both a laser beam shining axially into the applicable bore and displaceable perpendicular to the axis of the bore and a rotating deflection mirror inclined relative to the laser beam, which mirror is mounted on a slide that is provided with an annular gear and can be introduced into the continuous recess, is also advantageous.

For chamfering the encompassing edge formed by the through opening and the inner wall of the continuous recess, a grinding device with a conical grinding head that can be introduced into the continuous recess is also advantageous. Advantageously, the grinding device is disposed on a rod. The motion of the grinding head in the continuous recess is controllable in such a way, by a drive unit acting on the rod, that the grinding head is moved along the edge contour in accordance with a preset program. Dimensional tolerances in the edge contour can be compensated for by a spring bearing of the grinding head.

BRIEF DESCRIPTION OF THE DRAWINGS

Other features and advantages of the invention will be apparent from the description contained below, taken with the drawings, in which.

DESCRIPTION OF THE PREFERRED EMBODIMENTS

Figure 1:
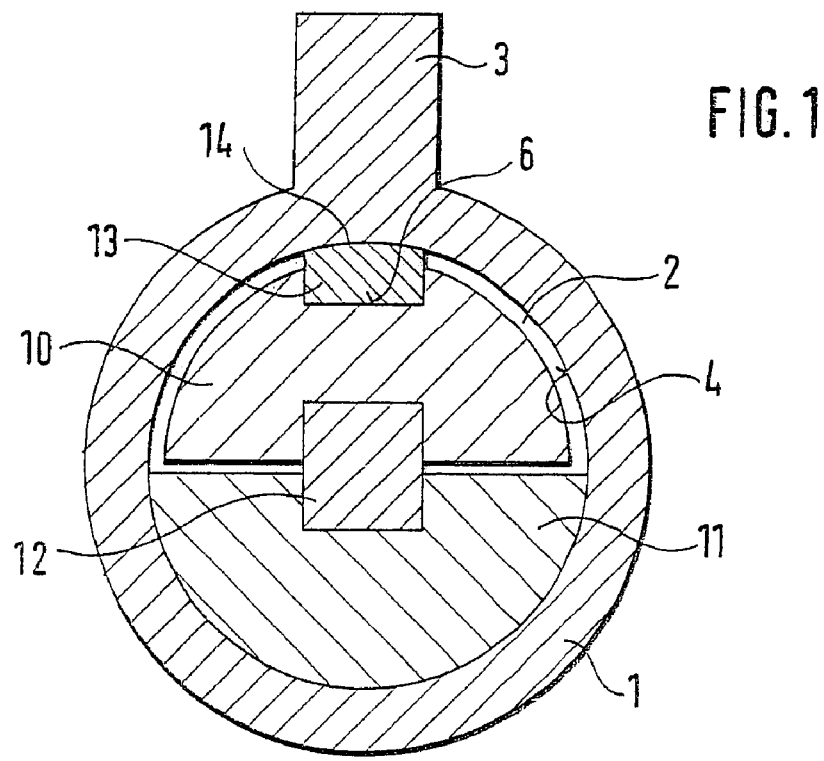
FIG. 1 is a cross section through a high-pressure fuel reservoir with a connection stub and an introduced chucking device, before a bore for the through opening is made.

In FIG. 1, a cross section is shown through a high-pressure fuel reservoir, which includes an elongated tubular metal jacket body 1, which for the sake of supplying fuel injection valves has formed-on connection stubs 3 produced for instance by forging. Naturally still other connection stubs 3 can also be provided, which serve to attach a high-pressure fuel pump or a pressure sensor. The interior of the high-pressure fuel reservoir is formed by a continuous recess 2, extending longitudinally of the jacket body 1 and preferably having a circular cross section. However, the cross section can take some other form instead, and for instance can be elliptical. The continuous recess 4 made in the jacket body 1 can be solidly closed on one face end. The other face end is open and can for instance be closed by a screwed-on pressure limiting valve, the attachment of the high-pressure fuel pump, a lid, or in some other way.

As is also shown in FIG. 1, a chucking device is thrust into the continuous recess 2 from the open side of the high-pressure fuel reservoir. The chucking device includes a central chucking part 12 and two chucking jaws 10 and 11 of semicircular cross section. The chucking jaws can have some other cross-sectional shape instead, however. In the example shown here, the outside radius of the first chucking jaw 11 is adapted to the radius of curvature of the inner wall 4 of the continuous recess 2. The outside radius of the second chucking jaw 10 is designed to be somewhat less than the radius of curvature of the inner wall 4 of the continuous recess 2. As can also be seen, the region of the second chucking jaw 10 that is oriented toward the connection stub 3 is provided with a recess 6, into which a pressure part 13 is inserted. The face contour 14 of the pressure part 13 oriented toward the inner wall 4 is adapted precisely to the contour of the inner wall 4. In the exemplary embodiment shown here, the face contour 14 and the inner wall 4 accordingly have the same radius of curvature. Other recesses and other pressure parts are correspondingly provided on the other connection stubs of the jacket body 1. If not all the connection stubs protrude in the same direction from the jacket body 1, then the chucking device may need to be rotated in order to produce all the bores. The chucking jaws 10, 11, the chucking part 12 and the pressure parts 13 are made from metal. However, it is also conceivable to use some other suitable material. For instance, the pressure parts can also be made from a very hard plastic.

Figure 2:
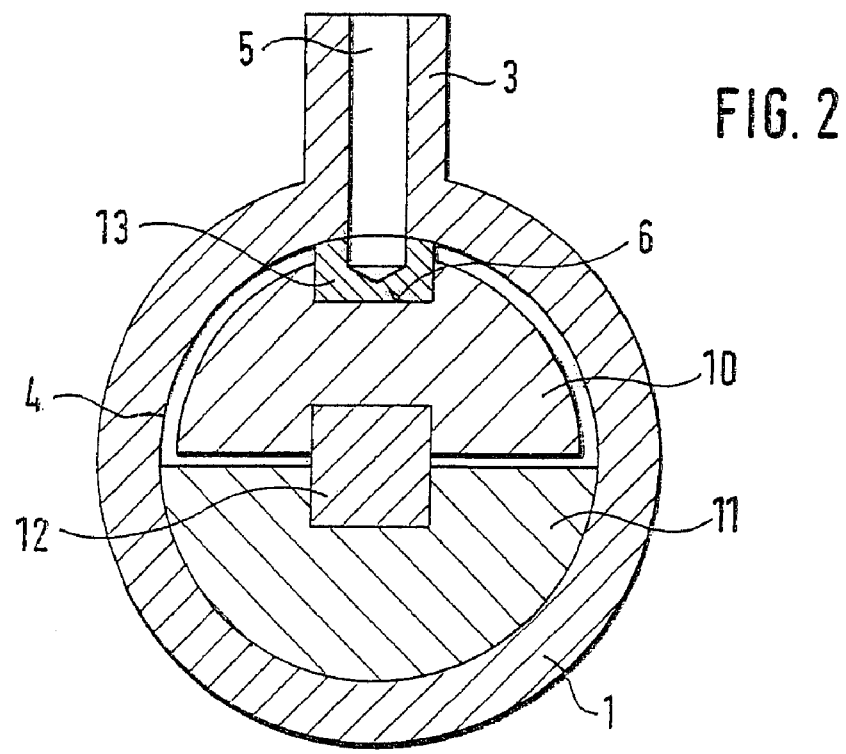
FIG. 2 is a cross section through the high-pressure fuel reservoir of FIG. 1, after the bore has been made.

The central chucking part 12 also has a wedge-shaped contour. By insertion of the chucking part 12, the first chucking jaw 11 and the pressure part 13 are pressed against diametrically opposed portions of the inner wall 4 of the continuous recess. As is shown in FIG. 2, to produce a through opening, a bore 5 in the nature of a blind bore is made in the connection stub 3 and the pressure part 13. Drilling is done to some distance into the pressure part 13 from outside through the connection stub 3 and the jacket body 1, using the drilling tool. Advantageously, drilling is done in such a way that the entire tip of the drilling tool enters into the pressure part 13. By means of the pressure part 13, the creation of a burr at the edge formed by the inner wall 4 and the bore 5 is avoided. The same procedure is employed for the other connection stubs. Then the drilling tool and the chucking device 10, 11, 12, 13 are removed. The connection stubs 3 can now be provided with a screw thread as well, onto which a high-pressure connecting line can be connected via a cone seal. After the chucking device has been removed, the insertion parts 13 can be replaced. Now the chucking device is once again ready for making further bores in the next high-pressure fuel reservoir to be machined.

Figure 3:
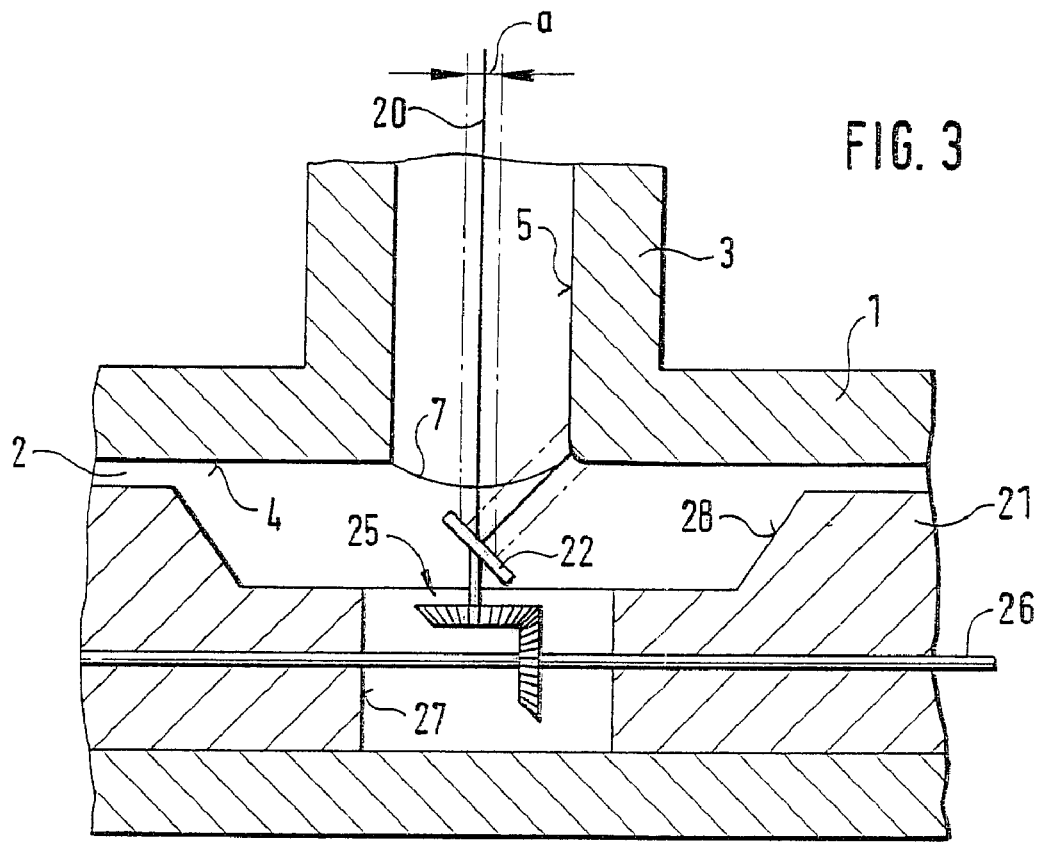
FIG. 3 schematically shows an apparatus with a laser for rounding off an edge formed by a bore and the inner wall of the continuous recess.

The encompassing edge 7 formed by the bores 5 and the continuous recess 2 can also be rounded off, as is shown for a first exemplary embodiment in FIG. 3. For this purpose, a laser beam 20 is used. A slide 21 provided with a mirror 22 is introduced into the continuous recess 2. The slide has a countersunk feature 28, in which the mirror 22 is disposed. The mirror 22 is supported rotatably about the axis of the laser beam 20 via an annular gear 25, disposed in a recess 27 of the slide 21 and embodied here in the form of bevel gearing. A drive shaft 26 disposed in the slide 21 drives the annular gear, causing the mirror 22 to rotate about the axis of the laser beam 20. The mirror 22 is inclined by a variable angle relative to the axis of the laser beam 20, and this angle of inclination is adjusted via an adjusting mechanism. The laser beam 20 can be displaced perpendicular to the axis of the bore 5, or perpendicular to the direction in which it is shone. This is represented by the arrow a in FIG. 3. As a result, the laser beam reflected from the mirror 22 migrates over the edge 7 at the position determined by the rotary position of the mirror 22 and melts this edge and thus rounds it off. The entire encompassing edge can thus be rounded off by rotating the mirror and displacing the laser beam. By a suitable choice of the rotary speed of the mirror 22 and the frequency with which the laser beam 20 is displaced perpendicular to the axis of the bore, it is also possible to machine regions of the edge 7 that are located outside a radial plane. If the mirror 22 becomes fogged during the machining of the edge 7, it can be replaced.

Figure 4:
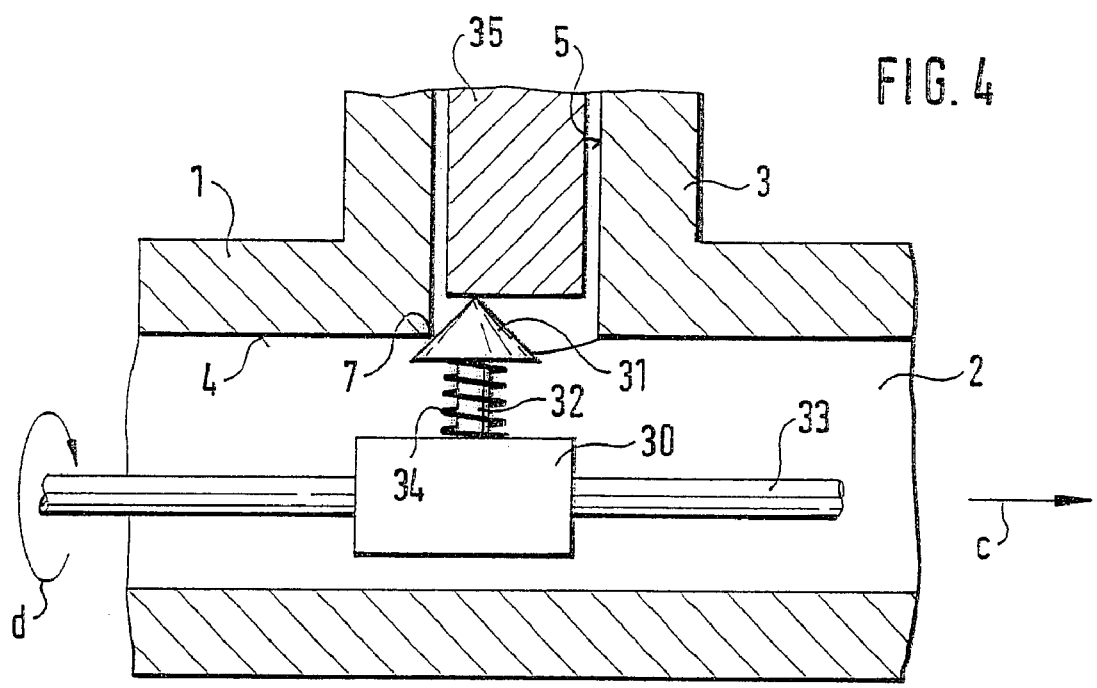
FIG. 4 schematically shows an apparatus for chamfering an edge formed by a bore and the inner wall of the continuous recess.

Another exemplary embodiment for machining the edge 7 formed by the bore 5 and the inner wall 4 of the continuous recess 2 is shown in FIG. 4. In this example, a grinding device 30 is used. The grinding device includes a turbo grinder with a conical grinding head 31; this head is supported spring-elastically on the grinding device 30 via a pin 32 and a spring 34 in such a way that the grinding head 31 can be displaced parallel to the pin 32, counter to the tensing force of the spring 34. A rod 33 serves to introduce the grinding device into the continuous recess 2. The grinding head 31 is placed with slight pressure against the edge 7. Via the rod 33, the motion of the grinding head 31 in the continuous recess 2 is controlled, and the motion of the rod 33 can be controlled for instance by a drive unit which is driven by an electric motor and which moves the grinding head 31 along the edge contour 7 in accordance with a preset program. Tolerances in the edge contour 7 are compensated for by the spring bearing of the grinding head 31. The encompassing edge 7 is chamfered in this way, and by means of a suitable course of motion it is possible here as well to machine regions of the edge 7 that are located outside a middle radial plane. To that end, in a first phase of motion, the grinding head 31 is first moved longitudinally along the arrow c in FIG. 4 and at the same time is rotated toward the left, in the direction of the arrow d, about the center axis of the rod 33, and then in a second phase of motion, it is moved onward in the direction of the arrow c in the longitudinal direction and toward the right counter to the arrow d. In the third phase, the grinding head is moved backward counter to the arrow c and toward the right again counter to the arrow d, and then in the fourth phase, it is moved onward longitudinally counter to the arrow c and at the same time toward the left in the direction of the arrow d, so that finally it reaches the starting point on the edge contour 7 again.

Triggering the grinding head 31 can be facilitated still further if an axially movable stop 35 is introduced into the bore, against which stop the tip of the conical grinding head 31 is pressed lightly.

The above-described method steps for producing the bore 5 and for rounding off or chamfering the edge 7 can also be performed whenever the bore 5 discharges into the continuous recess 2 eccentrically to the axis thereof.

The foregoing relates to a preferred exemplary embodiment of the invention, it being understood that other variants and embodiments thereof are possible within the spirit and scope of the invention, the latter being defined by the appended claims.

I claim:

1. A method for making a through opening in a high-pressure fuel reservoir that has an elongated, tubular jacket body (1), which body is provided in the longitudinal direction with a continuous recess (2), open on at least one side, that forms the interior of the high-pressure fuel reservoir, and the through opening (5) is made in the jacket body (1) in the form of a bore by a machining tool in such a way that this opening discharges into the continuous recess (2), the method comprising the steps of pressing a pressure part (13) against the inner wall (4) of the jacket body (1) in the region of the expected outlet of the through opening (5) before the through opening is made, then with the machine tool, drilling through the jacket body (1) some distance into the pressure part (13).

2. The method of claim 1, further comprising the step of rounding off or chamfering the encompassing edge (7) formed by the through opening (5) and the inner wall (4) of the continuous recess (2) after the through opening is made.

3. The method of claim 1, further comprising a chucking device (10, 11, 12, 13) that can be introduced into the continuous recess (2) by a first chucking jaw (10) having an interchangeable pressure part (13) and a second chucking jaw (11) and a chucking part (12) disposed between the first chucking jaw (10) and the second chucking jaw (11), by which chucking part the pressure part (13) and the second chucking jaw (11) can be pressed into contact with the inner wall (4) of the continuous recess (2).

4. The method of claim 3, wherein said pressure part (13) can be used as an insertion part into a recess (6) of the first chucking jaw (10).

5. The method of claim 3, wherein said pressure part (13) comprises metal or a very hard plastic.

6. The method of claim 3, wherein the radius of curvature of the face (14) of the pressure part (13) oriented toward the inner wall (4) of the continuous recess (2) is adapted precisely, at the point intended for making the through opening (5), to the radius of curvature of the inner wall (4) of the continuous recess (2).

7. The method of claim 2, further comprising a laser beam for rounding off an encompassing edge (7) formed at the intersection of the through opening (5) and an inner wall (4) of the continuous recess (2), said laser beam (20) being supported to shine axially into the applicable bore and being displaceable perpendicular to the axis of the bore, and a rotating deflection mirror (22) inclined relative to the laser beam (20), said mirror being mounted on a slide (21) that is provided with an annular gear (25) and can be introduced into the continuous recess (2).

8. The method of claim 2, further comprising a grinding device (30) provided for chamfering an encompassing edge (7) formed at the intersection of the through opening (5) and an inner wall (4) of the continuous recess (2), said grinding device having a conical grinding head (31) that can be introduced into the continuous recess.

9. The method of claim 8, wherein said grinding device (30) is disposed on a rod (33), and that the motion of the grinding head (31) in the continuous recess (2) is controllable in such a way, by a drive unit acting on the rod (33), that the grinding head (31) is moved along the edge contour (7) in accordance with a preset program.

10. The method of claim 9, wherein said grinding head (31) protrudes from the grinding device (30) approximately perpendicular to the rod (33) and is supported axially movably on the grinding device counter to the tensing force of a spring (34).

* * * * *